(12) United States Patent
Aponte et al.

(10) Patent No.: US 6,371,780 B1
(45) Date of Patent: Apr. 16, 2002

(54) RJ JACK WITH SWITCH

(75) Inventors: Luis A. Aponte, Andover; Mark Benda, Highland Lakes; Paul M. Rominski, Morris Plains; Joseph P. Savicki, Clinton; David S. DeVincentis, Flanders; Norris B. McLean, Englewood, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/570,821

(22) Filed: May 15, 2000

(51) Int. Cl.[7] .................................................. H01R 29/00

(52) U.S. Cl. ...................................... 439/188; 200/51.1

(58) Field of Search ................................ 439/188, 941, 439/676; 200/51.1

(56) References Cited

U.S. PATENT DOCUMENTS

| 5,030,123 | A | * | 7/1991 | Silver .......................... 439/188 |
| 5,178,554 | A | * | 1/1993 | Siemon et al. .............. 439/188 |
| 5,700,167 | A | * | 12/1997 | Pharney et al. ............. 439/941 |

* cited by examiner

*Primary Examiner*—Neil Abrams
*Assistant Examiner*—Phuong K T Dinh
(74) *Attorney, Agent, or Firm*—Duane Morris LLP

(57) ABSTRACT

A connection switch jack has first and second sets of pins, and a set of spring contacts for connecting the first and second sets of pins when the spring contacts are in a normally closed position. The jack has a receptacle for receiving a plug having a plurality of plug contacts, wherein receipt of the plug connects corresponding plug contacts to selected pins of the first set of pins via the spring contacts and then moves the switch off of the normally closed position to break the contact between the first and second sets of pins.

7 Claims, 12 Drawing Sheets

100

300

400
CROSS-CONNECT CONFIGURATION

500
PATCH CONFIGURATION

1300

SIDE VIEW
1310

REAR VIEW
1350

RJ JACK WITH SWITCH

BACKGROUND OF THE INVENTION

1. Field of the Invention

The present invention relates to communications interfaces and, in particular, to improved RJ jacks for providing patching.

2. Description of the Related Art

In communications systems, such as systems which employ packet switch technology for data and voice transmissions, there is a need to be able to connect, route, and patch various system elements. For example, the POTS (plain old telephone service) equipment and line servicing a given customer may need to be connected to telephony network element (TNE), to provide telephone service to the customer. The connection between two elements or pieces of equipment may be referred to as a circuit or path. There is often a need to patch in different or additional equipment, for example to provide DSL (digital subscriber line) service to a customer, or to replace current equipment such as a hub with different equipment.

DSX (digital signal cross-connect) modules and systems can be used for interconnection and patching purposes in a communications system. DSX products are used to connect one piece of digital telecommunication equipment to another, simplifying equipment connections and providing convenient test access and flexibility for rearranging and restoring circuits. DSX panels are available in numerous configurations and sizes to fit a wide variety of applications. The traditional DSX functions are patch, test, monitor, and cross-connect. DSX and other applications may employ conventional 310 or Bantam style telecommunications jacks (sometimes referred to as Bantams or Bantam jacks).

At T1 (1.544 Mbps) or E1 (2.048 Mbps) rates, DSX-1 panels connect network equipment such as office repeater bays, channel banks, multiplexers, digital switches, loop carriers, and loop switches. At the T3 (44.736 Mbps) rate, DSX-3 panels provide terminations for the high-speed (DS3 rate) side of the M13 multiplexers, and the low speed (DS3 rate) side of the digital radio and fiber-optic systems. The backbone of the digital network in North America incorporates the DS1, DS1C, and DS3 signal rates. A variety of equipment within telephone company sites, and increasingly at customer locations, interface at these signal rates. This equipment typically includes various multiplexers, channel banks, office repeaters, and digital switches. The key element interfacing the equipment is the DSX hardware. This allows for the termination, cross-connection, and access of the digital signal.

Referring now to FIG. 1, there is shown a prior art cross-connect configuration 100 using a dual or a single monitor Bantam IN/OUT circuit slice. This shows a standard approach to provide the TNE service using a DSX in a cabinet, e.g. basic telephony service. In configuration 100, the subscriber POTS circuit is cross-connected to the TNE. In general, the connection between two elements by way of a circuit or path may be a direct interconnect or a cross-connection, as will be appreciated. Two independent Bantam jacks (slice A) are used to terminate the POTS equipment at the TNE. Unlike traditional DSX circuits, this example involves only one pair of wires, not two. The cross-connect is accomplished by wire wrapping the jumper wires to the cross-connect pin field, as illustrated. Separate Bantam jacks (for dual monitoring MON/IN, MON/OUT or single monitoring MON/OUT) are used to monitor the IN/OUT telephony signals.

FIG. 2 shows how the DSL equipment is added to the POTS line to provide the DSL service to the subscriber by patching the POTS DSX circuit (slice A) to a second DSX circuit (slice B) for the DSLAM. As shown, two patch cords are used to connect slices A and B together. Both patch cords in slice A open the cross-connect circuits that connects the IN (POTS) and the OUT (TNE) circuits to slice B, providing a path for both equipment cable IN and OUT termination field ports to slice B. A hybrid RJ48 cord is wire-wrapped to both cable termination fields on the rear of slice B and the RJ48 plug is connected to the Seicor splitter box. The splitter box provides a bifurcation feature that allows the POTS line to terminate at the TNE, and the DSL signals from the subscriber to terminate at the DSLAM.

To install such a system, a 56 circuit Bantam panel would have to be split into two groups of 28 circuits each. One group of 28 slices connects the POTS to the TNE. The other 28 slice group has 28 RJ48 hybrid cords wire-wrapped to the IN/OUT cable termination field ports. The RJ48 hybrid cords would be pre-connected with one end wire-wrapped to the cable termination field, and the other plugged into the splitter box. Therefore, one group of 28 slices is for the POTS-TNE cross-connect, and the other group of 28 slices is for the Splitter box and provide spares for future patching.

However, the use of DSX devices can be undesirable because of the complexity and expense of such devices (e.g., DS1 and DS3 cross-connect equipment). Moreover, using the configuration shown in FIG. 2 to provide patching can lead to wire congestion and unnecessary complexity. It can be difficult to selectively interconnect components and to provide patching. DSX systems are often used for interconnection purposes because they enable restoration or rollover of voice network equipment. Although rollovers do not occur frequently, the ability to perform rollovers are of critical importance to a service provider. The key DSX features that enable rollovers are the monitor (m) and patch (p) ports located at the front of a DSX circuit module. DSX systems also provide signal termination of all active systems. However, the presence of monitor taps in each circuit makes it difficult to attain high bit-rate in DSX systems.

SUMMARY

According to the present invention, a connection switch jack has first and second sets of pins, and a set of spring contacts for connecting the first and second sets of pins when the spring contacts are in a normally closed position. The jack has a receptacle for receiving a plug having a plurality of plug contacts, wherein receipt of the plug connects corresponding plug contacts to selected pins of the first set of pins via the spring contacts and then moves the switch off of the normally closed position to break the contact between the first and second sets of pins.

DESCRIPTION OF THE PREFERRED EMBODIMENT

RJs (registered jacks, sometimes described as RJ-XX) are telephone connection interfaces (receptacle and plug). The term jack sometimes means both receptacle and plug and sometimes just the receptacle. The most common telephone jack is the RJ-11 jack, which can have six conductors but usually is implemented with four. The RJ-11 jack is typically used in a household or office. The ordinary "untwisted" wire (sometimes called "gray satin" or "flat wire") of a telephone is typically connected to the RJ-11 jack. A standard computer modem is also typically connected to an RJ-11 jack. The RJ-11 jack, in turn, connects to the "outside" longer wires ("twisted pair") that connect to the telephone company central office (CO) or to a private branch exchange (PBX). The four wires are usually characterized as a red and green pair and a black and white pair. The red and green pair typically carry voice or data. On an outside phone company connection, the black and white pair may be used for low-voltage signals such as phone lights. On a PBX system, they may be used for other kinds of signaling.

An RJ-14 jack is similar to the RJ-11, but the four wires are used for two phone lines. Typically, one set of wires (for one line) contains a red wire and a green wire. The other set contains a yellow and black wire. Each set carries one analog "conversation" (voice or data). An RJ-45 jack is a single-line jack for digital transmission over ordinary phone wire, either untwisted or twisted. The interface has eight pins or positions. For connecting a modem, printer, or a data PBX at a data rate up to 19.2 Kbps, untwisted wire may be used. For faster transmissions, twisted pair wire must be used.

Regardless of configuration, each RJ jack contains a receptacle, inside which is a set of spring contacts. These spring contacts are connected to a corresponding set of pins (terminals) on the jack, which may be soldered, for example, to a circuit board. The receptacle receives a plug of a cable. The plug has a corresponding set of contacts, each connected to a corresponding conductor of the cable. Thus, by plugging in the plug of the cable into the receptacle of the RJ jack, the spring contacts of the receptacle come into electrical contact with the corresponding contacts of the plug. Thus, a device at the other end of the cable can be connected to a device electrically connected to the terminals of the circuit board. This permits easy connection or disconnection of elements, to make or break a circuit or path.

The present invention provides an interconnection device with improved interconnect and patch functionality. In an embodiment, a standard RJ family jack is modified by adding thereto a switching function, to provide an RJ switch jack.

Figure 3:
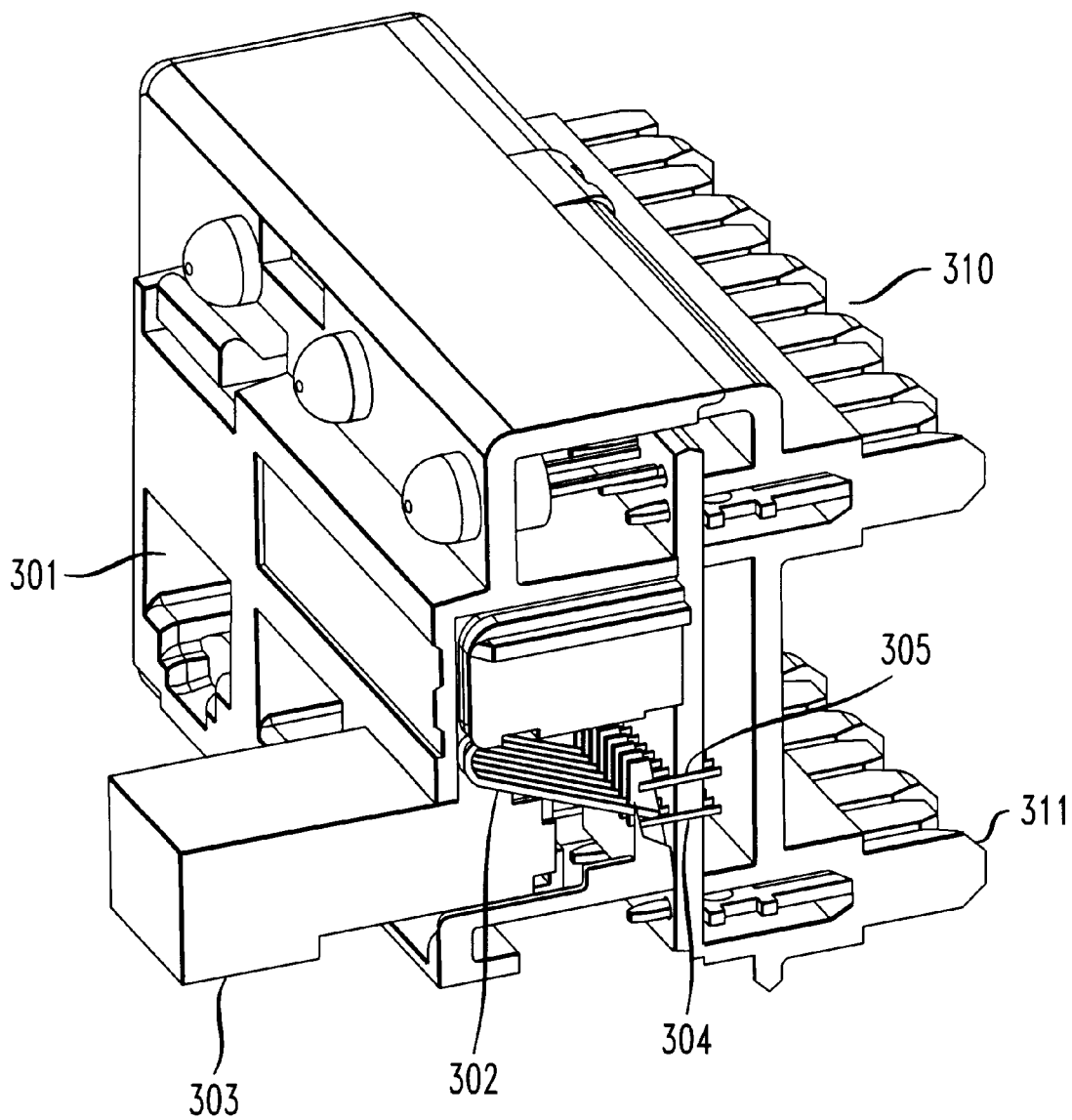
FIG. 3 is a perspective view of an RJ switch jack module in accordance with an embodiment of the present invention.

Referring now to FIG. 3, there is shown a perspective view of an RJ switch jack module 300, in accordance with an embodiment of the present invention. Module 300 comprises several RJ switch jacks, three of which are shown in FIG. 3, the third shown in cut-away to illustrate internal features thereof. Each RJ switch jack of module 300 has characteristics similar to a conventional RJ jack, namely a receptacle such as receptacle 301, with spring contacts and a set of pins, except that it also has a switching function, operated by the insertion of a male plug 303 into its female port 301.

The RJ switchjack 300 contains at least first and second sets of pins 310, 311 which can be connected to a circuit board. The first set of pins are permanently connected to the first end of the spring contacts 302. The second set of pins are connected to internal normally closed (NC) contacts 304, which electrically contact the second ends of the spring contacts 302 in a NC position. Thus, the spring contacts 302 themselves act as the switch. When a plug 303 is not inserted into the receptacle 301, the spring contacts 302, in the NC position 304, couple pins of the first set 310 to corresponding pins of the second set 311, thus providing paths between the first and second sets of pins.

When a plug 303 is inserted into the receptacle 301, contacts of the plug make electrical contact with corresponding spring contacts 302, and thus, to the first set of pins 310. The plug 303 contacts are not shown, but are inside the grooves of the plug which match the spring contacts 302 when the plug 303 is inserted. As electrical contact is made during the insertion of the plug 303, this physically begins to move the spring contacts 302 off of the NC contacts 304. As illustrated, plug 303 is just beginning to be inserted into a receptacle 301 and electrical contact has just been made, but the spring contacts 302 have not yet been moved off of NC contacts 304. Thus, just after an electrical connection is made between the second end of each spring contact 302 and the corresponding contact of the plug (thereby connecting the plug to the first set of pins), the connection between the spring contact 302 and the internal contact 304 is broken (thereby disconnecting the first set of pins 310 from the second set of pins 311). Thus, this provides a "make-before-break" type patch or connection.

That is, in NC position, the first set of pins 310 is electrically connected to the second set of pins 311. This may be a direct interconnect, or cross-connect, depending on how pins of the switch jack are configured, e.g. by jumpers. When a plug 303 is inserted, having a series of plug contacts coupled to corresponding conductors of the cable, the first set of pins 310 is coupled to the plug contacts, and then the first set of pins 310 is disconnected from the second set of pins 311.

Depending on how the pins of the plug are configured, and depending upon how many and which contacts the plug 303 has, a make-before-break patch may thus be performed, i.e. to replace or substitute new equipment at the end of the cable for whatever equipment is connected to the second set of pins 311. That is, the equipment or element coupled to the first set of pins is switched from being connected to the equipment of the second set of pins, to equipment connected to the cable. In addition, dual patching may also be performed to insert new equipment into the path between the equipment at the first and second sets of pins.

In an alternative embodiment, as described below, another set of internal contacts 305 is provided in the RJ switch jack, for the normally open (NO) position. Compensation circuitry may be connected to the NO contacts 305, to compensate for the increased path length introduced by insertion of a cable. In this embodiment, the NO contacts 305 are connected directly to compensation circuitry, without the use of a third set of pins on the RJ switch jack. In an alternative embodiment, a corresponding set of pins (not shown) may be provided for the NO position.

The RJ switch jack may be implemented using any given RJ jack of the RJ family, such as RJ11 (4-wire), RJ14 (6-wire), RJ45 (8-wire data), and RJ48 (8-wire transmit/receive telephony). RJ switch jack 300 may be used to provide interconnection and patching in a variety of applications and contexts, as described in further detail below with reference to FIGS. 4–12. For example, RJ switch jack 300 may be used for central office (CO) and premise circuit switched voice and packet switched data, and other customer premise equipment (CPE) applications.

RJ switch jack 300 is a versatile physical data switch termination and test access device, which can be provided more economically than various DS-1 and DS-3 DSX devices, yet provide similar functionality. Thus, the RJ switch jack may be used instead of DSX devices in many applications. RJ switch jack 300 may also be used in a data centric (packet) network, offering features such as rollover, interconnection, and cross-connection that have not been previously applied to data-centric network technology. By employing the RJ switch jack, there is provided a robust and functional way for users to evolve from telephony to data (voice-over-IP). Thus, the RJ switch jack can be used, potentially as a standard, in both telephony and data-centric circuits.

Figure 1:
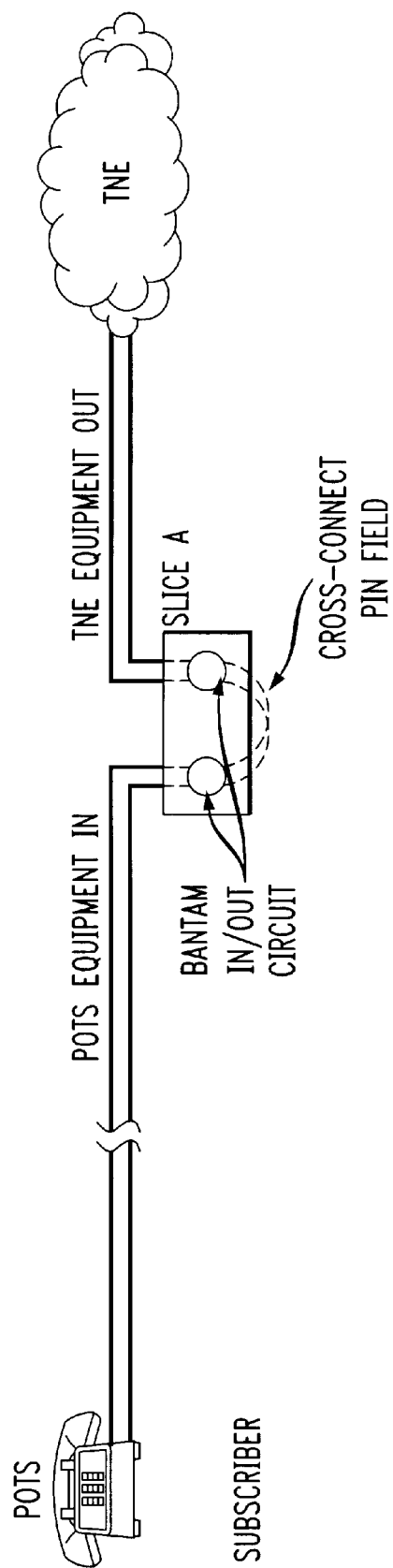
FIGS. 1 and 2 illustrate the use of DSX devices to provide cross-connect and patch configurations, respectively.
Figure 2:
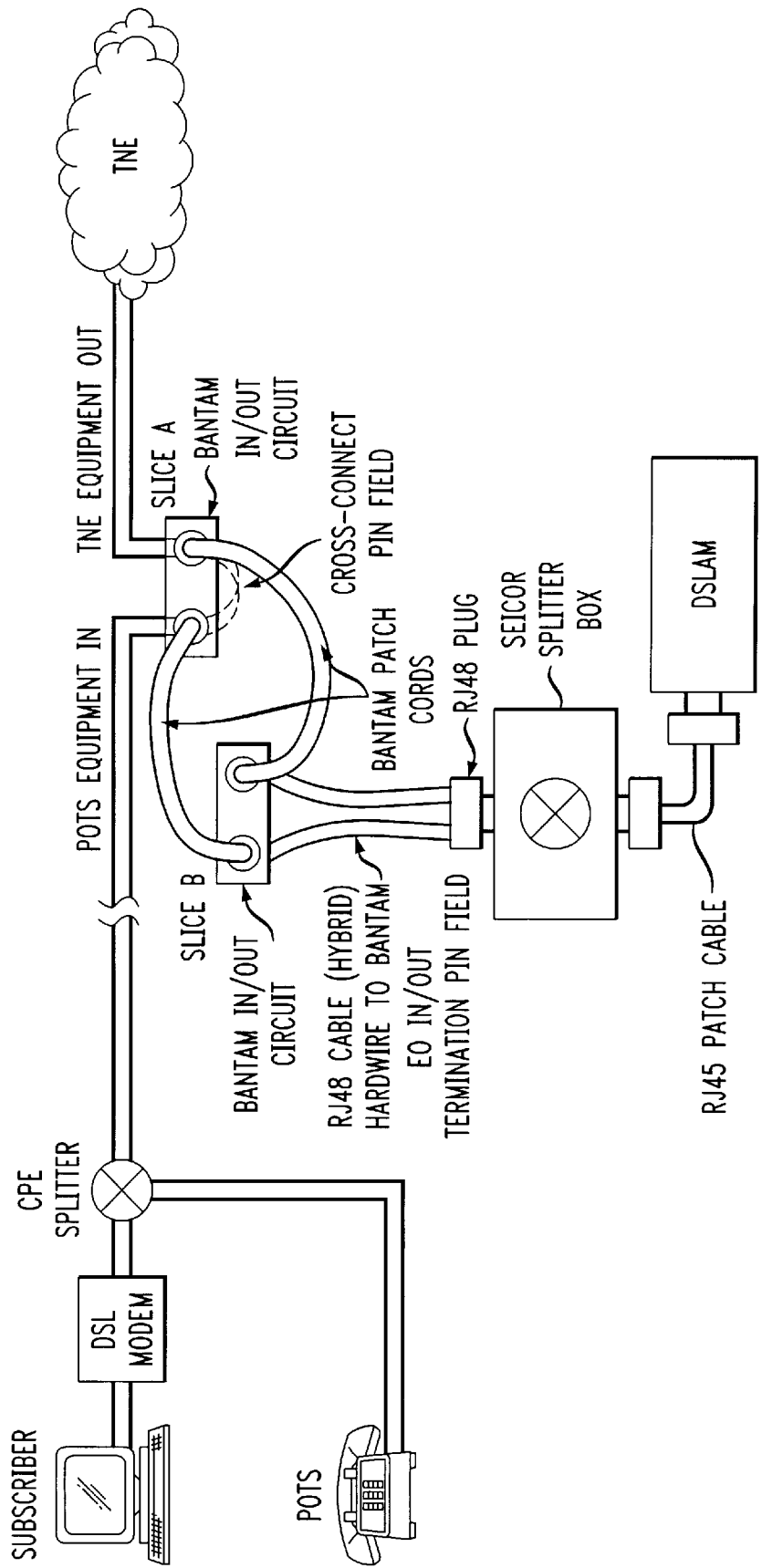

As discussed above with reference to FIGS. 1 and 2, a DSX product may be used to provide cross-connect (FIG. 1) and dual patching (FIG. 2) features to deploy DSL in a cabinet. The RJ switch jack 300 of the present invention may also be used to provide such features, but more economically and with less wire congestion and complexity of implementation, as described below with reference to FIGS. 4 and 5. The use of RJ switch jack 300 to implement these features is more robust and is more cost effective than a system employing DSX and Bantam devices; further, use of the RJ switch jack bifurcates two signals more efficiently than a DSX product.

Figure 4:
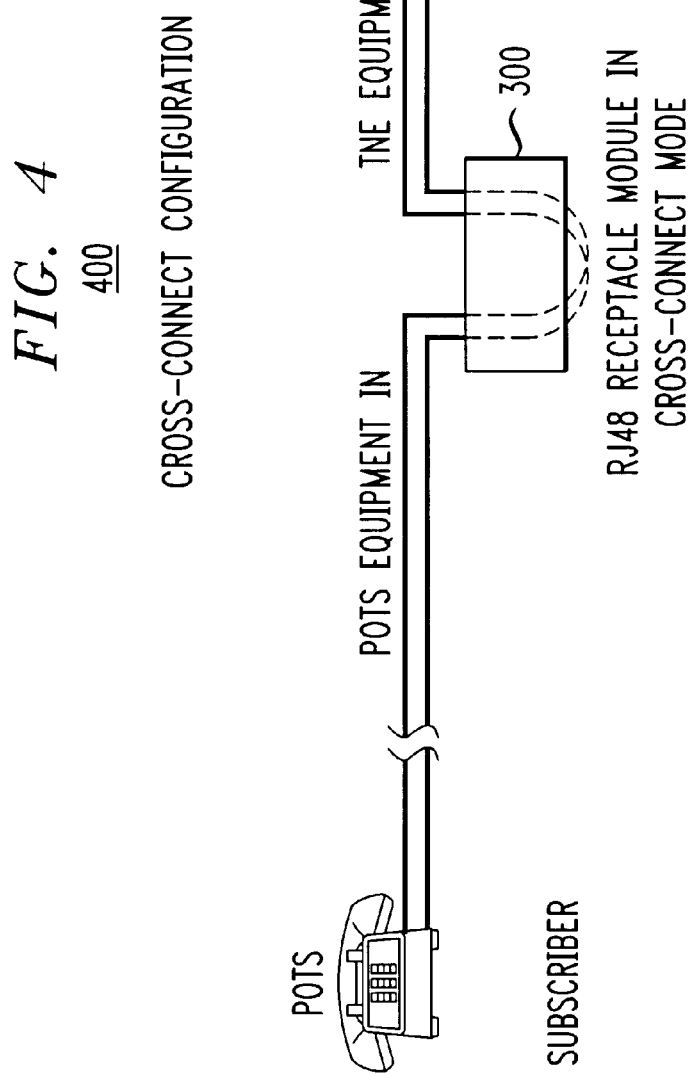
FIGS. 4 and 5 illustrate the use of an RJ48 type switch jack to provide selective cross-connection and patching, respectively, to deploy DSL in a cabinet.
Figure 5:
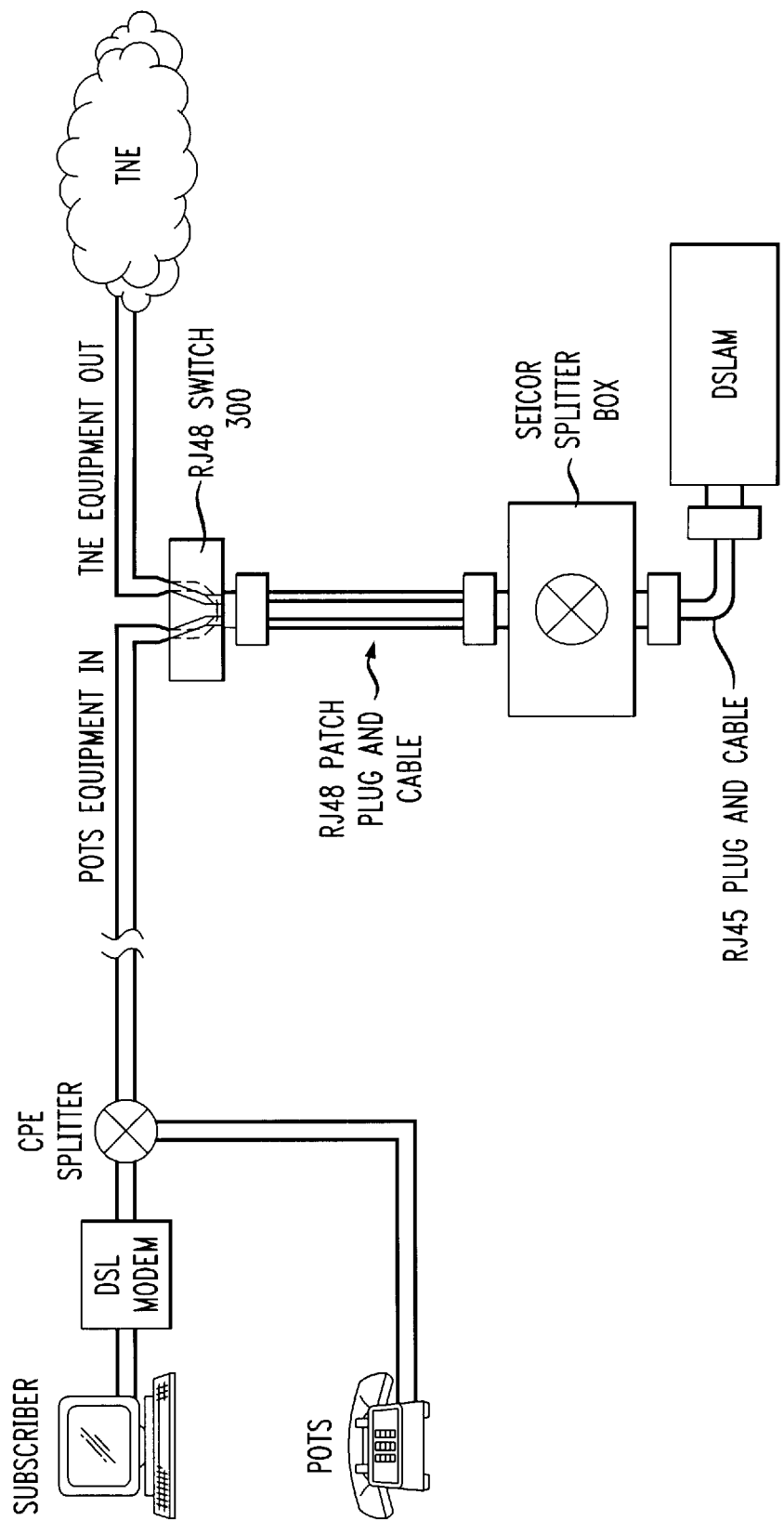

FIGS. 4 and 5 illustrate the use of an RJ48 type switch jack 300 to provide selective cross-connection and dual patching to deploy DSL in a cabinet. In this application, the RJ switch jack is used to insert a DSL path into an existing path by providing a make-before-break dual patch. FIG. 4 shows a cross-connect configuration 400 using RJ switch jack 300. In configuration 400, the POTS equipment is cross-connected to the TNE by RJ switch jack 300 with its switch in the NC position, thus terminating at the TNE. Thus, the POTS equipment is connected to pins of the first set of pins; and the TNE is connected to some other pins of the first set of pins. Jumpers are connected to the second set of pins to cross-connect some of the second set of pins to each other. FIG. 5 shows the dual patch configuration 500, in which a DSLAM is patched into the path between POTS equipment and TNE by plugging the RJ48 patch plug and cable into socket 301 of RJ48 switch jack 300. This accomplishes the cross-connect and dual patch (path insertion) achieved with a DSX approach (FIGS. 1, 2), except it uses only one RJ switch jack instead of two Bantam jacks. This thus provides a simpler and more robust approach to achieving cross-connection and patching than is possible in the DSX approach described above with reference to FIGS. 1 and 2.

Figure 6:
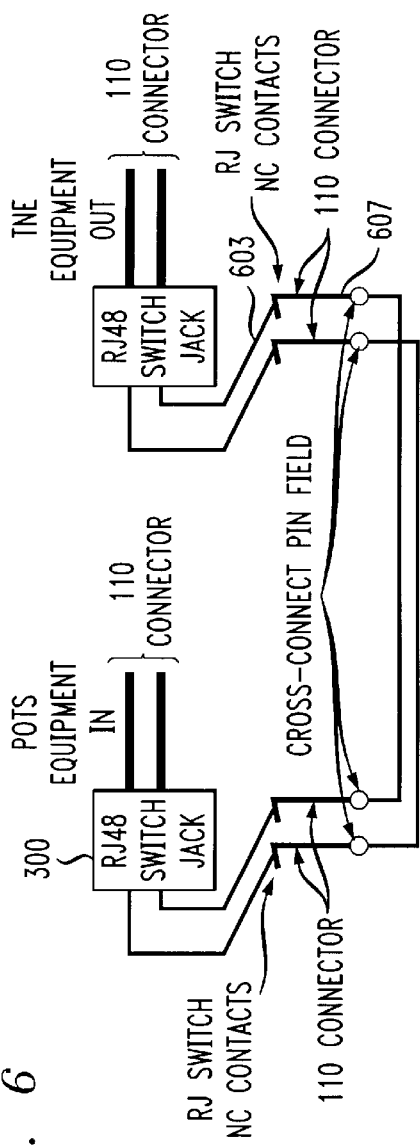
FIGS. 6 and 7 are electrical schematic representations of the RJ switch jack contacts in the cross-connect and patch configurations of FIGS. 4, 5, respectively.
Figure 7:
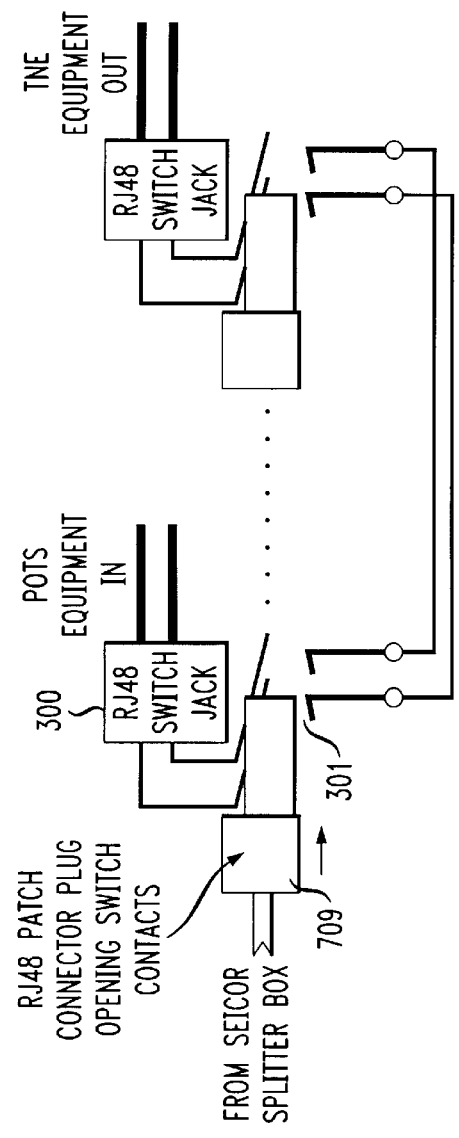

Referring now to FIGS. 6 and 7, there are shown electrical schematic representations of the RJ switch jack contacts in cross-connect and dual patch configurations 400, 500 of FIGS. 4, 5, respectively. FIGS. 6 and 7 represent one twisted pair of contacts with circuitry. FIG. 6 shows spring contacts 603 connecting to the cross-connect contacts or pins 607 on a 110 connector.

This is done by the second (movable) ends of spring contacts 603 connecting an internal contact, in NC position, which internal contact is coupled to the second set of pins, which are themselves coupled to the 110 connector contacts. Only a single RJ48 switchjack 300 is used, although two similar functional blocks are shown for ease of illustration. The upper left representation of switch jack 300 has pins of the first set of pins coupled to the POTS equipment, while the upper right representation of switch jack 300 has selected pins of the first set of pins coupled to the TNE equipment. By connecting coupled devices in this manner via a cross-connection of selected pins of the first set of pins, a dual patch may be made to insert a new DSL or other path into the existing path between the two coupled devices.

When a dual patch (path insertion) is to be made, an RJ48 patch connector plug 709 is inserted into socket 301, as shown in FIG. 7. This makes electrical contact between corresponding wires of the cable and the POTS equipment and TNE equipment coupled to the pins of the first set of pins. After electrical contact is made, completion of the plug insertion and secure seating thereof physically moves the switch contacts into open position. Thus, a make-before-break dual patch or path insertion is made by simply plugging in the plug, thus automatically inserting whatever is connected to the RJ48 patch cable, e.g. a Seicor splitter box. The splitter box may itself be connected to another element, such as a DSLAM unit to provide DSL service to the customer at the POTS end, as described below with reference to FIG. 9.

Figure 8:
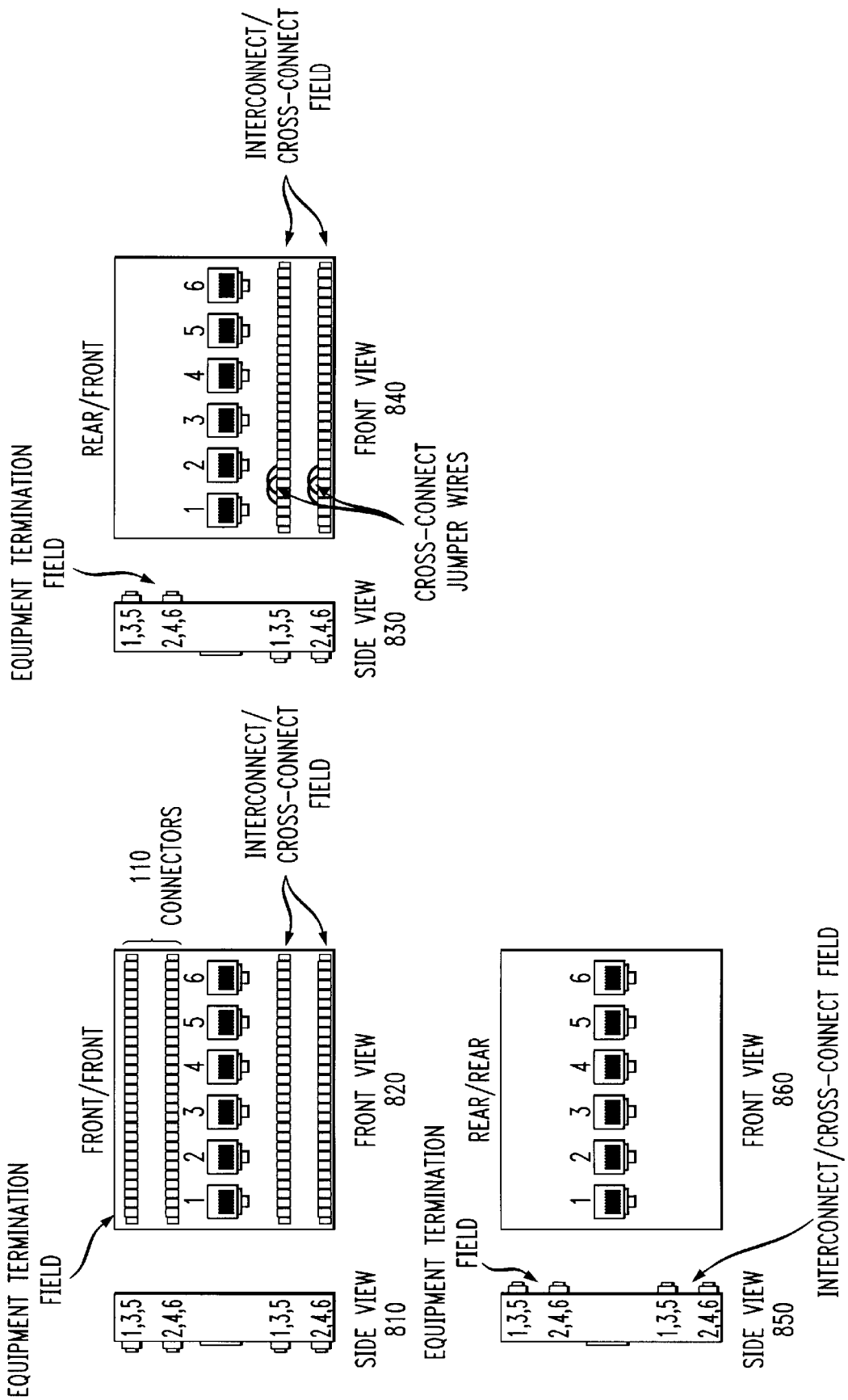
FIG. 8 contains side and front views of three different configurations of an RJ48/RJ45 switch jack module containing several RJ switch jacks of FIG. 3.

Referring now to FIG. 8, there are shown side and front views of three different configurations of an RJ48/RJ45 switch jack module containing several RJ switchjacks 300. In particular, views 810 and 820 show side and front views, respectively, of a front/front (front equipment cable and cross-connect access) configuration; views 830, 840 show side and front views of a rear/front (rear equipment cable and front cross-connect access) configuration; and views 850, 860 show side and front views, respectively, of a rear/rear (rear equipment cable and cross-connect access) configuration. Manufacturing all three configurations is the same except for the direction of inserting the 110 contacts, and different plastic enclosures. As will be appreciated, a cross-connect is accomplished by "punching down" jumper wires on the 110 Type IDC (Insulated Displacement Contact) cross-connect field, as shown in front view 840. Monitoring the IN/OUT telephony signal is accomplished by connecting a modified IDC type 110 P8 (8 conductor) or 110 P4 (4 conductor) CAT 5 Patch cable to the equipment cable termination field.

Referring once more to FIG. 5, to deploy DSL, one end of a double-ended RJ48 patch cord is connected to a splitter box (see FIG. 9) and the other end (plug 709) is connected to the RJ switchjack 300. When the RJ48 plug 709 is inserted into the RJ switch jack 300, it connects both circuits to the splitter box, and then disconnects the cross-connect at the RJ switch jack. The make-before-break type dual patch prevents telephony interruptions by making connection to the splitter box before breaking the cross-connection.

Figure 9:
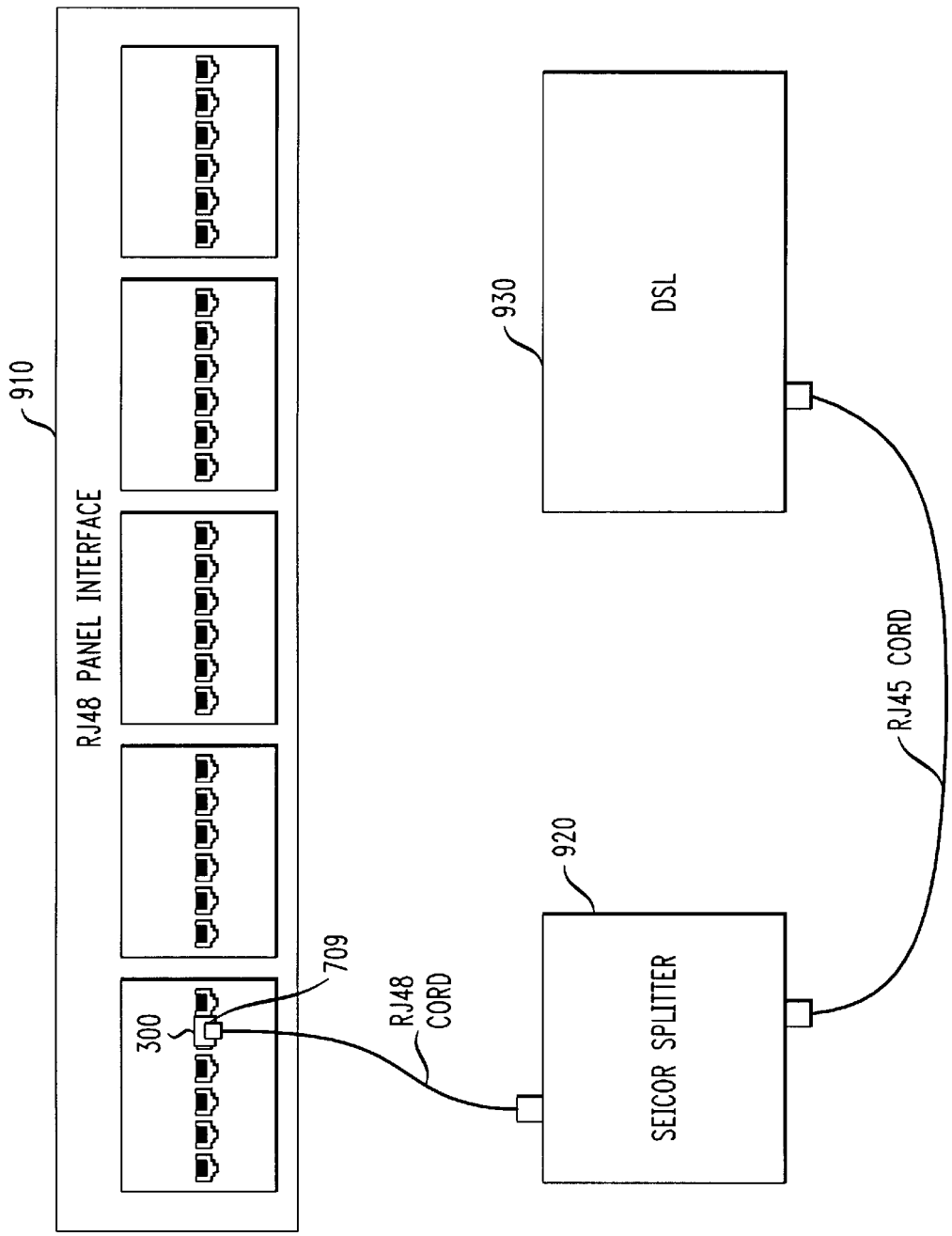
FIG. 9 shows an RJ48 panel interface comprising a number of RJ48 switch panels, illustrating the addition of DSL service to a subscriber.

Thus, by using the RJ switch module of the present invention, connecting DSL to a subscriber is achieved by simply plugging in an RJ48 plug into the RJ switch jack, while disconnecting is accomplished by simply removing the RJ48 plug. This is illustrated in FIG. 9. In this embodiment, the hard-wired pins at the back (not shown) of a given RJ48 switch jack 300 are used to cross-connect two elements, such as customer POTS equipment and TNE for providing a telephony and data channel. To provide DSL service from DSL 930, the RJ48 cord from the Seicor splitter 920 is simply plugged into the jack 300, thereby instantly patching the DSL 930 into the customer channel, by a dual patch or path insertion. By contrast, with the standard DSX approach, one has to plug two patch cords at the same time, which can be difficult and cumbersome.

If a two-end RJ-plug patch cord is used, no hardwiring of the RJ48 hybrid cord is required. Use of DSX devices requires hardwiring the "raw-end" of a single-ended RJ48 hybrid cord. Further, in using the RJ switch jack of the present invention, no grouping of a DSX panel or hardwiring a RJ48 cord to connect to a splitter port is required. This makes the RJ switch panel easier to install than a Bantam product.

To re-establish a DSL signal from another port would only require plugging one end of the RJ48 cord to another splitter port and then plugging the other end of the RJ48 cord back to the RJ switch jack. A physical representation of an RJ switch jack panel 910, splitter box 920, and DSL unit 930 (e.g., DSLAM) are shown in FIG. 9. For the Bantam to perform this feature, one would have to redirect both patch cords to another dedicated Bantam slice (a spare) that is already hardwired to another splitter port. To minimize telephony interruptions, both Bantam patch cords are first removed from the cross-connect (see FIG. 2, slice A) and then the other end of patch cords are removed from slice B and plugged into another spare slice. Once connected to the other spare slice, the other end of both patch cords are plugged back into the cross-connect Bantam (slice A) and thus re-establishing DSL service back to the subscriber.

The RJ switch jack 300 of the present invention is much smaller than the Bantam devices, and only one is required to perform the function performed by two Bantam devices. Further, the RJ switch jack provides the flexibility of intrusive patching and additional wire circuits for future data requirements. For example, DSX products typically have 2 twisted pair circuits, limiting the ability for an increase in data flow. However, with RJ switch jack 300, two inactive pairs of wiring are available for future increase in data. Most homes are wired with two twisted pairs.

Figure 13:
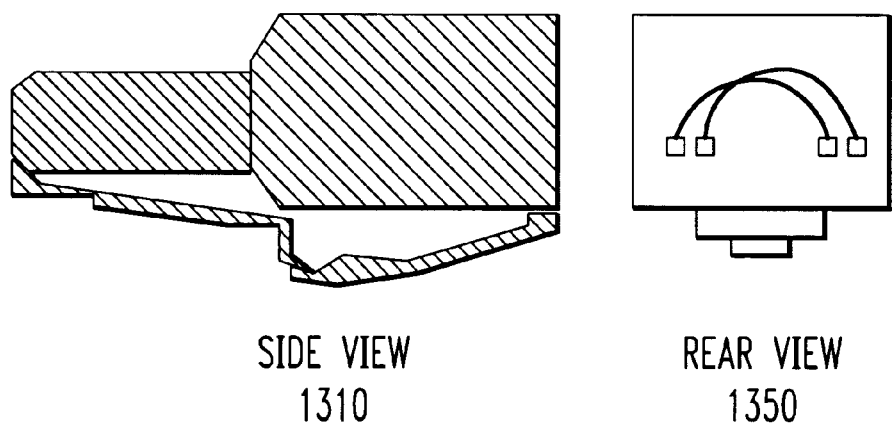
FIG. 13 shows side and rear views of an RJ loop plug for use in providing rollover with the RJ switch jack of FIG. 3.

RJ switch jacks may be combined into RJ switch jack modules, which may be themselves combined into RJ switch jack panels. For example, a 2.25-inch high, 23-inch panel can accommodate five 6-port RJ switch jack modules. A 6-inch high Bantam panel has 56 circuits but can only accommodate 28 subscribers. By contrast, a 23-inch RJ switch jack panel can accommodate 30 subscribers. The Bantam approach uses an IN/OUT loop plug during a rollover function. An RJ loop plug 1300, as illustrated in FIG. 13, may be used for rollover with the RJ switch jack. A panel of RJ switch jacks having higher density than a Bantam panel can be manufactured at lower cost than a Bantam panel, and only requires inexpensive patch cords to use. One reason for the lower manufacturing cost is that no soldering is required, and due to the use of compliant pin assembly, standard 0.062 epoxy printed wiring board, and plastic molding.

Figure 10:
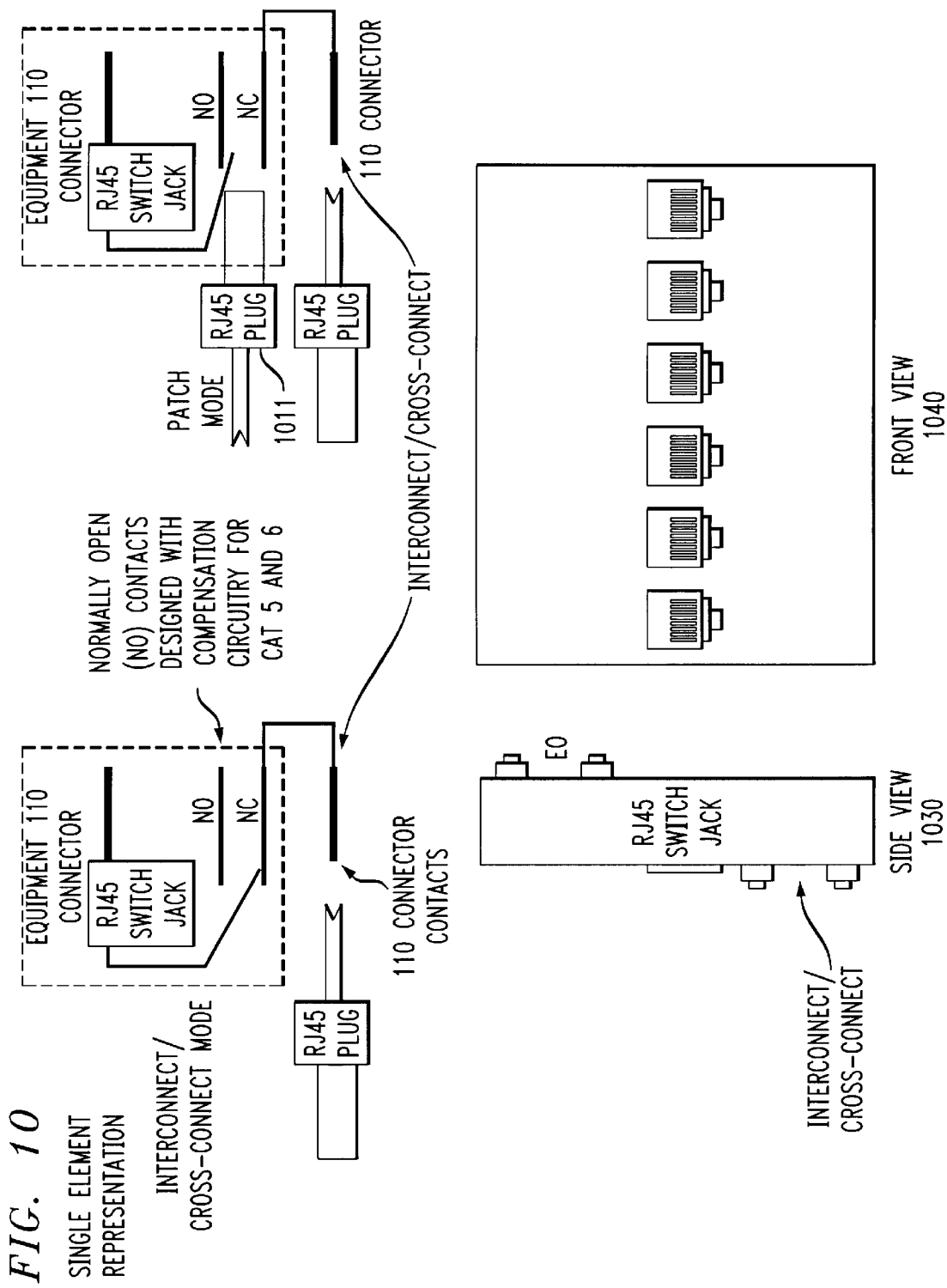
FIG. 10 illustrates cross-connect and patch mode configurations of a module employing dual connection RJ switch jacks for use in both data (interconnect) and telephony (cross-connect)

In an alternative embodiment, an RJ45 configuration is used instead of a RJ48 by dedicating and assigning the RJ45 contacts and pairs to function as an RJ48. An RJ45 switch jack in accordance with the present invention may be configured as a cross-connect for telephony use or as an interconnect for data. Referring now to FIG. 10, there is shown a schematic and a exemplary module configuration to use for data and telephony, in both cross-connect and patch modes 1010, 1020, respectively. Side and front views 1030, 1040 of the RJ45 switch module are also shown in FIG. 10. Instead of punching down RJ45 cords to the interconnect field, the module can be converted into a cross-connect device by punching down jumper wires over the interconnect/cross-connect field, as will be appreciated by those skilled in the art.

The RJ switch jack of the present invention can be extended to a variety of products, contexts, and implementations, including the data-centric CAT 5 and CAT 6 technology to increase its functionality. It can also replace other products to perform a DSX function that includes the DIXI-1, Bantam and 800/900 hardware families, and some coax products. The RJ switch jack can facilitate transition to a data-centric CAT 5 system, with GIGA Speed and intrusive patch by exception.

In the embodiment shown in FIG. 10, in addition to the first and second sets of pins described above, a third set of contacts is provided for the normally open (NO) position of the spring contact switches. These contacts may have a corresponding third set of pins, for coupling to compensation circuitry, for example, or may otherwise be electrically connected to compensation or other circuitry. For example, in NC position, the RJ45 switch jack of FIG. 10 may couple CAT 5 (100 MHz per twisted-pair) or CAT 6 (GIGA speed) equipment such as user and hub. It may be desired to patch in a new hub, by RJ45 plug 1011, which is connected at its other end to a spare hub (not shown). Because of the high frequencies and tolerances of CAT 5 and 6 operation, the introduction of the cable and its associated losses can require compensation circuitry to control crosstalk, insertion loss, and return loss. This may be attached to the NO contact, so that whenever the spring contacts are opened, they contact the NO contact and thus couple compensation circuitry to the new path between the user and the new hub. The compensation circuitry may be built into the circuit board or the RJ switch jack itself, or it may be coupled to a pin for the NO contact.

Figure 11:
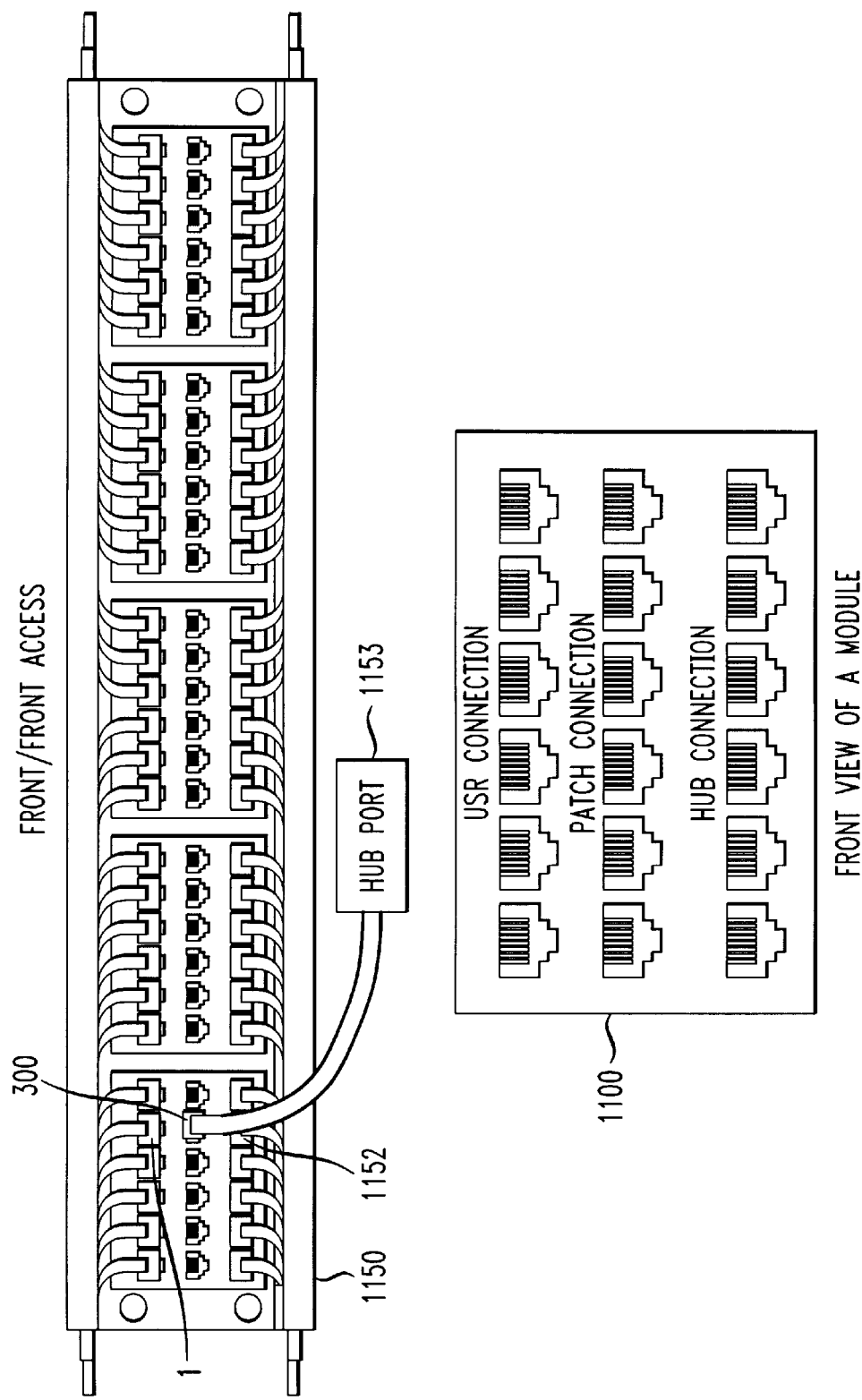
FIG. 11 is a front view of an RJ45 switch interface panel, having five modules.

FIG. 10 shows a patch panel configuration using 110 connectors. Referring now to FIG. 11, there is shown an RJ45 switch interface panel 1100, having five modules 1150 (shown in front view). This embodiment employs a similar patch panel configuration as shown in FIG. 10, but uses RJ to RJ connection instead of 110 connectors. Panel 1100 is a front/front access panel. A user connected at RJ45 jack 1151 is normally connected by RJ switch jack 300 to the hub connected to RJ45 jack 1152. However, to patch the user to a different hub port 1153, its patch cord is inserted into RJ45 switch jack 300, which instantly and automatically connects the user and RJ45 jack 1151 to hub port 1153 instead of to the hub port connected to RJ45 jack 1152.

Figure 12:
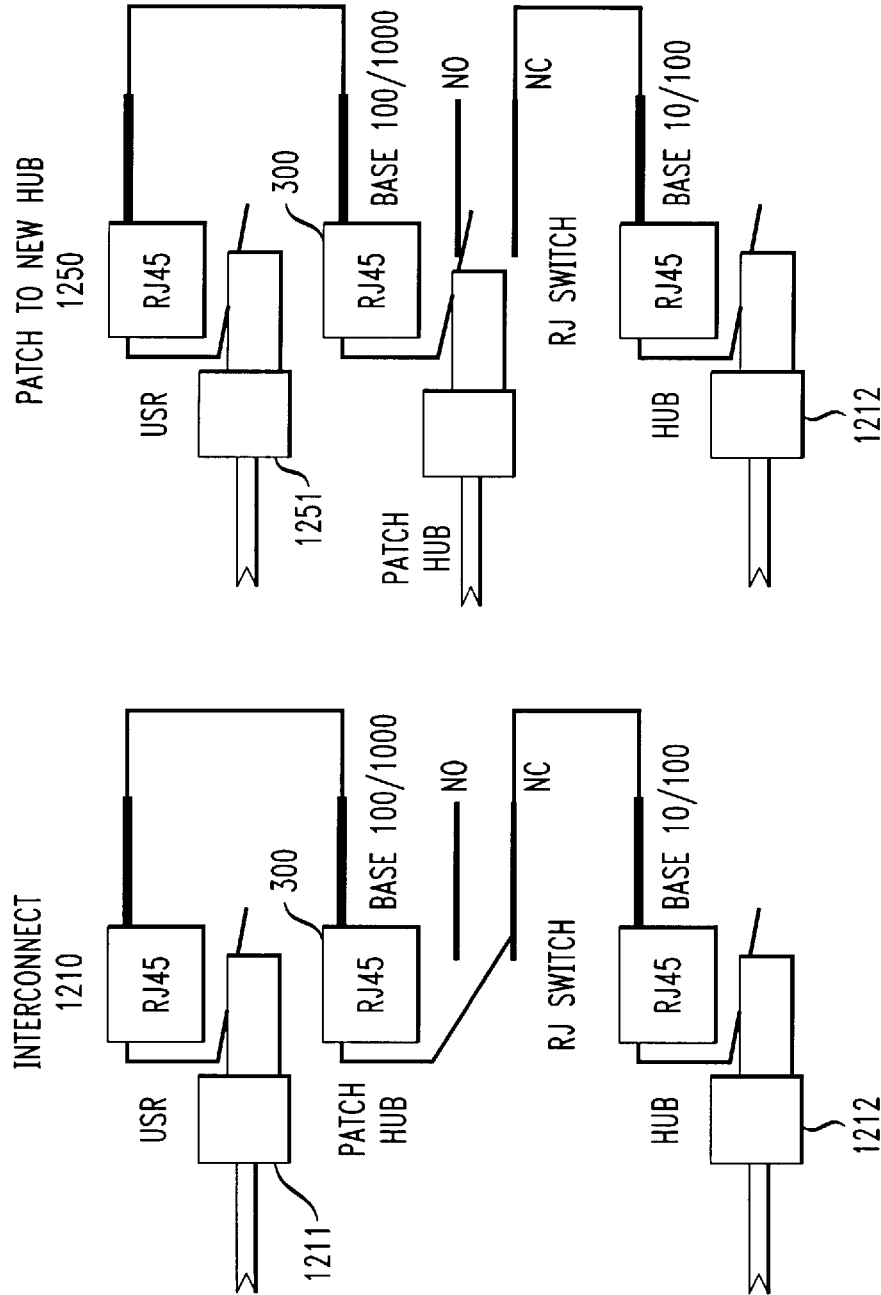
FIG. 12 is an electrical schematic representation of the contacts of a dual connection RJ switch jack, in the cross-connect and patch configurations.

Referring now to FIG. 12, there is shown interconnect and patch configurations 1210, 1250, respectively, for a DSL data patch panel with dual contact switch and intrusive patch by exception. The user (USR) and hub (HUB) have RJ45 connectors 1211, 1212, respectively (see FIG. 11); alternatively, these may be hard-wired to 110 connectors (see FIG. 10). Unlike a typical patch panel that is deployed with patch cords that provide connection to the equipment termination field, the patch-by-exception panel can be deployed without patch cords. The patch-by-exception panel enables hardwiring on both equipment; and the patch of the patch-by-exception panel provide intrusive patching to the equipment termination field.

Referring once more to FIG. 10, the figure illustrates evolving telephony features into data features. As shown in FIG. 12, the inter-connect/cross-connect fields could be a Base 10/100 inter-connect or a telephony cross-connect (for 110 IDC connectors only). Since the patching feature is directly connected to cords, designing the equipment cable connector in close proximity to the RJ switch with an addition of compensation circuitry on the NO contacts can provide a switch capable of handling a Base 100/1000. Such a configuration may be universally used in both telephony and IP data environments.

In a premise environment, the RJ switch jack may also be used for a DSL signal configuration, giving a user data plus telephony or patch in data at a Base 1000 using voice-over-IP instead of telephony. The increase in Base is due to designing the input connections directly behind the RJ switch jack with a 110 IDCs or a RJ jack. As will be appreciated, the RJ switch jack of the present invention can enhance or complement many aspects of data-centric network configurations.

Accordingly, the RJ switch jack of the present invention may be used for DSX applications, i.e. to provide cross-connect and dual patching for telephony applications; and also for standard interconnecting and patching in data-centric applications.

The RJ switch jack of the present invention provides a copper solution, applying user friendly telephony functionality to a data-centric network system. The present invention further provides an available transition to go from telephony to voice-over-IP. The RJ-switch module employing RJ switch jacks can consist of 110-connectors (or wire-wrap pins) for connecting equipment cable and cross-connections and facilitate all patching of voice/DS0, DS1/T1, E1 and data/DSL signals.

In alternative embodiment, an interconnect switch jack may be provided which is not based on the RJ jack family.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A connection switch jack, comprising:

(a) first and second sets of pins;

(b) a set of spring contacts for connecting the first and second sets of pins when the spring contacts are in a normally closed position, wherein each spring contact is electrically connected, at a first end, to corresponding pins of the first set of pins and each spring contact is electrically connected, at a second end, in the normally closed position, to corresponding contacts coupled to corresponding pins of the second set of pins; and (c) a receptacle for receiving a plug having a plurality of plug contacts, wherein receipt of the plug connects corresponding plug contacts to selected pins of the first set of pins via the spring contacts and then moves the switch off of the normally closed position to break the contact between the first and second sets of pins; and (d) a third set of contacts, wherein each spring contact is electrically connected, at the second end, in a normally open position, to corresponding contacts of the third set of contacts and the contacts of the third set of contacts are electrically coupled to compensation circuitry to control for crosstalk and return loss introduced in CAT 5 or CAT 6 operation when a cable is patched into the receptacle.

2. The switch jack of claim 1, wherein the switch jack is used for interconnecting and patching in data-centric applications.

3. The switch jack of claim 2, wherein user equipment is coupled via pins of the first set of pins to first data equipment connected to corresponding pins of the second set of pins when the spring contacts are in the normally closed position, wherein the user equipment is patched to second data equipment connected to the plug, when the plug is inserted into the receptacle, instead of to the first data equipment.

4. The switch jack of claim 1, wherein the switch jack is used to provide cross-connection and dual patching for telephony applications.

5. The switch jack of claim 4, wherein, when the spring contacts are in the normally closed position, customer equipment connected to selected pins of the first set of pins is cross-connected to telephony network equipment connected to other selected pins of the first set of pins, wherein patched equipment connected to the plug is dual patched into the path between the customer equipment and the telephony network equipment when the plug is inserted into the receptacle.

6. The switch jack of claim 1, wherein the switch jack is an RJ switch jack.

7. The switch jack of claim 6, wherein the RJ switch jack is one of an RJ11 switch jack, an RJ14 switch jack, an RJ45 switch jack, and an RJ48 switch jack.

* * * * *